Patented Feb. 17, 1953

2,628,905

UNITED STATES PATENT OFFICE 2,628,905

METHOD OF PREVENTING DISCOLORATION OF SLICED ORGANIC MATERIALS

Lloyd L. Antle and Ralph M. Bohn, Atlanta, Ga., assignors to L. L. Antle & Co., Inc., Atlanta, Ga., a corporation of Georgia No Drawing. Application December 26, 1951, Serial No. 263,467

14 Claims. (Cl. 99—154)

This invention relates to anti-oxidants and more particularly to a means and method of preventing discoloration of potatoes, pome fruit, and such other fruits, vegetables and organic material as are discolored when exposed to the atmosphere.

In the past, the frying of potatoes in deep fat, commonly called French-frying, presented certain difficulties for the average restaurant. The peak in demand for these potatoes coincides with the demand for all other foods; therefore, there is little time for the peeling and slicing of potatoes immediately prior to frying. If potatoes are peeled and sliced some hours before frying and during a slack period for a restaurant, they turn black unless removed from the atmosphere.

The most common method of removing sliced potatoes from the atmosphere is to immerse them in water; however, if kept under water, the potatoes absorb the water; and, when placed in deep fat, the water, thus entrained, causes sputtering, foaming, and undue cooling of frying fat or oil. In addition, the excess water acts as an acceleration in the hydrolysis and rancidification of the fat or oil.

Sulfur dioxide gas has been used for many years to prevent the discoloration of apples, peaches, figs and other fruits when exposed to air during drying and freezing or storing. Sodium sulfite and sodium bisulfite in solution have also been used for this purpose; however, sodium sulfite is alkaline, which is disadvantageous in that it may make the foodstuffs alkaline, to the detriment of their color and flavor. Sodium bisulfite, on the other hand, is too acid and solutions of this salt are unstable and give off sulfur dioxide which is offensive. If these objections could be overcome, solutions of sodium bisulfite would be ideal for preventing the discoloration of freshly peeled potatoes, as well as other fruits and vegetables as mentioned above.

Accordingly, it is an object of our invention to provide a stable water soluble compound which will prevent discoloration of potatoes, pome fruit and such other fruits and vegetables as are discolored by exposure to the atmosphere.

Another object of our invention is to provide a compound having the characteristics mentioned above whose pH will not be affected by the foodstuffs with which it comes in contact.

Another object of our invention is to provide a compound having the characteristics mentioned above whose pH will not be affected by the varied pH's of the water from various localities.

Another object of our invention is to provide a method of preventing discoloration of potatoes or other vegetable or fruit prior to frying which, when the foodstuff is fried, will not cause sputtering or foaming of the hot oil or fat.

Another object of our invention is to provide a compound for preventing discoloration of potatoes or other vegetables or fruits prior to frying which, when that food is fried, will minimize hydrolysis of the oil or fat.

Another object of our invention is to provide a method of preventing discoloration of potatoes and other fruits and vegetables which will provide a substantially dry food for frying.

Another object of our invention is to provide a method of preparing and frying potatoes or other fruits or vegetables which will give a superior fried food product.

Other and further objects and advantages of our invention will become apparent from the following disclosure of the compound chosen for illustration and the process wherein this compound is used.

As mentioned above, sodium bisulfite is an unstable acid which gives off fumes of sulfur dioxide and is too acid for satisfactory use. We have found however, that by increasing the pH of a solution of sodium bisulfite through adding a suitable buffer, both objections mentioned above may be eliminated.

Sodium bisulfite normally has a pH of approximately 5.1, however, substantially any sodium bisulfite solution with a pH below about 5.2 will give off sulfur dioxide. Therefore, through the addition of a suitable buffer, we have increased the pH to approximately 5.8. Of course, with the addition of more buffer, the pH will accordingly be increased; however, we have found that the optimum solution to produce the desired effects is as mentioned above. With a pH of 5.8, the sodium bisulfite gives off no odor, loses no gases, and remains stable for long periods of time. Moreover, the buffer solution prevents the food immersed in a solution of sodium bisulfite and buffer from changing the pH of the solution during use, thus greatly increasing the effective life of the solution. The buffer also offsets variations in the pH of water supplies in different localities.

For convenience, it is best to prepare our mixture as a dry product which, when ready for use, may be easily dissolved in water.

In use, the potatoes are peeled, sliced and immediately dipped in a buffered solution of sodium bisulfite for periods of time ranging from one to several minutes, depending on the strength of the solution, the thickness of the slice, and the character of the potato. We have found one-half an ounce of our mixture to one gallon of water to be the optimum solution for the average potatoes sliced for French-frying. After proper immersion, the potatoes are removed, the excess solution is allowed to drain and the potato slices permitted to dry slightly on their surfaces before frying. If the processed slices are kept for more than a few hours, they should be kept in a closed container in a refrigerated condition. It will be obvious to those skilled in the art that, with certain modifications, the same solution and procedure may be employed for preventing discoloration of other fruits and vegetables.

In making a buffered solution of sodium bisulfite, we have used a mixture comprising the following compounds in substantially the following proportions by weight:

| | Per cent |
|---|---|
| Sodium bisulfite | 85 |
| Sodium carbonate | 10 |
| Citric acid | 5 |

Replacement of the part of the citric acid by ascorbic acid increases the efficiency of the solution, since ascorbic acid is itself a good discoloration preventive. It is understood, however, that any suitable edible buffer may be substituted in the place of those mentioned above without departing from the scope of our invention and that the proportions listed do not constitute the only proportions of our mixture which are operable. We have found that sodium bisulfite solutions, containing buffers which increase the pH to 6.5, function as described above. It will also be apparent that potassium bisulfite or potassium carbonate may be substituted for the respective sodiums without departing from the scope of our invention.

It will be apparent from the foregoing description that, with bulk preparation of French-fried potatoes and other vegetables and fruits, the use of our invention has varied and wide application in the culinary art. It is further apparent that many variations may be made in our method and means as disclosed, without departing from the scope of our invention as defined in the following claims.

We claim:

1. A process for preventing discoloration of peeled sliced vegetable and fruit particles comprising, dipping said particles in a solution of sodium bisulfite buffered with an edible buffer to a pH of 5.2 to 6.5, thereafter draining said particles, then drying said particles for subsequent frying.

2. A process for preventing discoloration of freshly cut particles of fruits and vegetables comprising intimately contacting said particles with an aqueous solution containing approximately one-half ounce of anti-oxidant to one gallon of water, said anti-oxidant comprising a preponderance of a sulfiting agent having present therein ions of sulfite together with ions of the group comprising sodium and potassium, in combination with ions of carbonate, and a weak acid selected from the group comprising ascorbic acid and citric acid, said ions of carbonate and said weak acid acting together as a buffer to maintain the pH of said solution substantially constant and within the pH range of from approximately 5.2 to approximately 6.5, then draining said particles, and subsequently cooking said particles.

3. A process of providing improved French-fried potatoes comprising peeling and cutting said potatoes into slices, then intimately contacting said slices of potatoes with an aqueous solution of a sulphur dioxide agent in which ions of sulfite together with ions of the group comprising sodium and potassium are present, said solution being buffered with an edible buffer to a pH range from approximately 5.2 to approximately 6.5, then removing the moisture from the surface of said slices of potatoes, and thereafter frying said potatoes.

4. A process for preventing discoloration of freshly cut particles of fruits and vegetables comprising intimately contacting said particles with an aqueous solution of an acid sulfite of the group comprising sodium bisulfite and potassium bisulfite buffered with an edible buffer to a pH range of from 5.2 to 6.5, and thereafter drying said particles for subsequent storage.

5. A process for preventing discoloration of freshly cut particles of fruits and vegetables comprising intimately contacting said particles with a solution of a sulphur dioxide producing agent in which ions of sulfite are present together with ions of the group comprising sodium and potassium, said solution being buffered with and edible buffer in which ions of carbonate are present together with a weak acid selected from the group consisting of ascorbic acid and citric acid, said solution having an H+ ion concentration such that the pH value of said solution is between approximately 5.2 and approximately 6.5, and thereafter removing excess moisture from the surface of said particles.

6. A process of providing improved French-fried potatoes comprising peeling and cutting said potatoes into slices, then intimately contacting said slices of potatoes with an aqueous solution of a sulphur dioxide agent selected from the group consisting of potassium bisulfite and sodium bisulfite, in combination with an edible buffer selected from the group comprising sodium carbonate, and potassium carbonate plus a weak acid selected from the group comprising ascorbic acid and citric acid, said solution having a pH range of from 5.2 to 6.5, then removing the moisture from the surface of said slices of potatoes and thereafter frying said slices of potatoes.

7. A process for preventing discoloration of freshly cut particles of fruits and vegetables comprising intimately contacting said particles with a solution containing an anti-oxidant, said anti-oxidant comprising approximately 85%, a sulphur dioxide agent, and the remainder a buffer agent, said sulphur dioxide agent being selected from the group comprising potassium bisulfite and sodium bisulfite, said buffer agent being an edible buffer, said solution having a pH range of from 5.2 to 6.5.

8. A process for preventing discoloration of freshly cut particles of fruits and vegetables comprising, intimately contacting said particles with an aqueous solution containing a mixture, said mixture comprising approximately 85% sodium bisulfite, approximately 10% sodium carbonate, and approximately 5% citric acid, whereby the pH of said solution is approximately 5.6 to approximately 5.8.

9. A process for preventing discoloration of freshly cut particles of fruits and vegetables comprising, intimately contacting said particles with a solution containing a mixture comprising, approximately 85% sodium bisulfite, approximately 10% sodium carbonate, and the remainder citric acid, and ascorbic acid, whereby the pH of said solution is between approximately 5.2 and approximately 6.5.

10. A process for preventing discoloration of fruits and vegetables comprising, cutting said fruits and vegetables into slices, and then intimately contacting said slices with a solution containing sodium bisulfite, sodium carbonate and ascorbic acid, said solution having a pH range of from approximately 5.2 to approximately 6.5.

11. A process for preventing the discoloration of fruits and vegetables comprising, cutting said fruits and vegetables into slices, and then intimately contacting said slices with a solution comprising sodium bisulfite, sodium carbonate and citric acid, said solution having a pH range of from approximately 5.2 to approximately 6.5.

12. A process for preventing discoloration of sliced potatoes comprising, cutting said fruits and vegetables into slices, and then intimately contacting said slices with an aqueous solution containing approximately one-half ounce of a mixture to one gallon of water, said mixture containing a preponderance of a sulphur dioxide agent in which ions of sulfite together with ions of the group comprising sodium and potassium are present, said solution being buffered with an edible buffer to a pH of from approximately 5.2 to approximately 6.5.

13. A process for providing improved French-fried potatoes comprising peeling and cutting potatoes into slices, then immediately thereafter intimately contacting slices of said potatoes with an aqueous solution containing approximately one-half ounce of a mixture to one gallon of water, said mixture containing approximately 85% a bisulfite, selected from the group comprising potassium bisulfite and sodium bisulfite, approximately 10% a carbonate selected from the group comprising sodium carbonate and potassium carbonate and approximately 5% a weak acid selected from the group comprising ascorbic acid and citric acid whereby the pH of said mixture is approximately 5.6, thereafter draining said slices, then frying said slices.

14. A process for preventing discoloration of particles of fruits and vegetables comprising intimately contacting said particles for approximately one minute with a solution containing approximately one-half ounce of an anti-oxidant to one gallon of water, said anti-oxidant comprising approximately 85% sodium bisulfite, approximately 10% sodium carbonate and approximately 5% citric acid, and having a pH of approximately 5.6, then draining said solution from said particles.

LLOYD L. ANTLE.
RALPH M. BOHN.

REFERENCES CITED

The following references are of record in the file of this patent:

UNITED STATES PATENTS

| Number | Name | Date |
|---|---|---|
| 2,417,932 | Kalmar | Mar. 25, 1947 |
| 2,440,911 | Pancoast | May 4, 1948 |
| 2,475,838 | Johnson | July 12, 1949 |
| 2,506,793 | Kalmar | May 9, 1950 |